W. GUTENKUNST.
SWITCH MECHANISM FOR OVERHEAD CARRIER CABLES.
APPLICATION FILED MAR. 5, 1909.
931,861.
Patented Aug. 24, 1909.
2 SHEETS—SHEET 1.
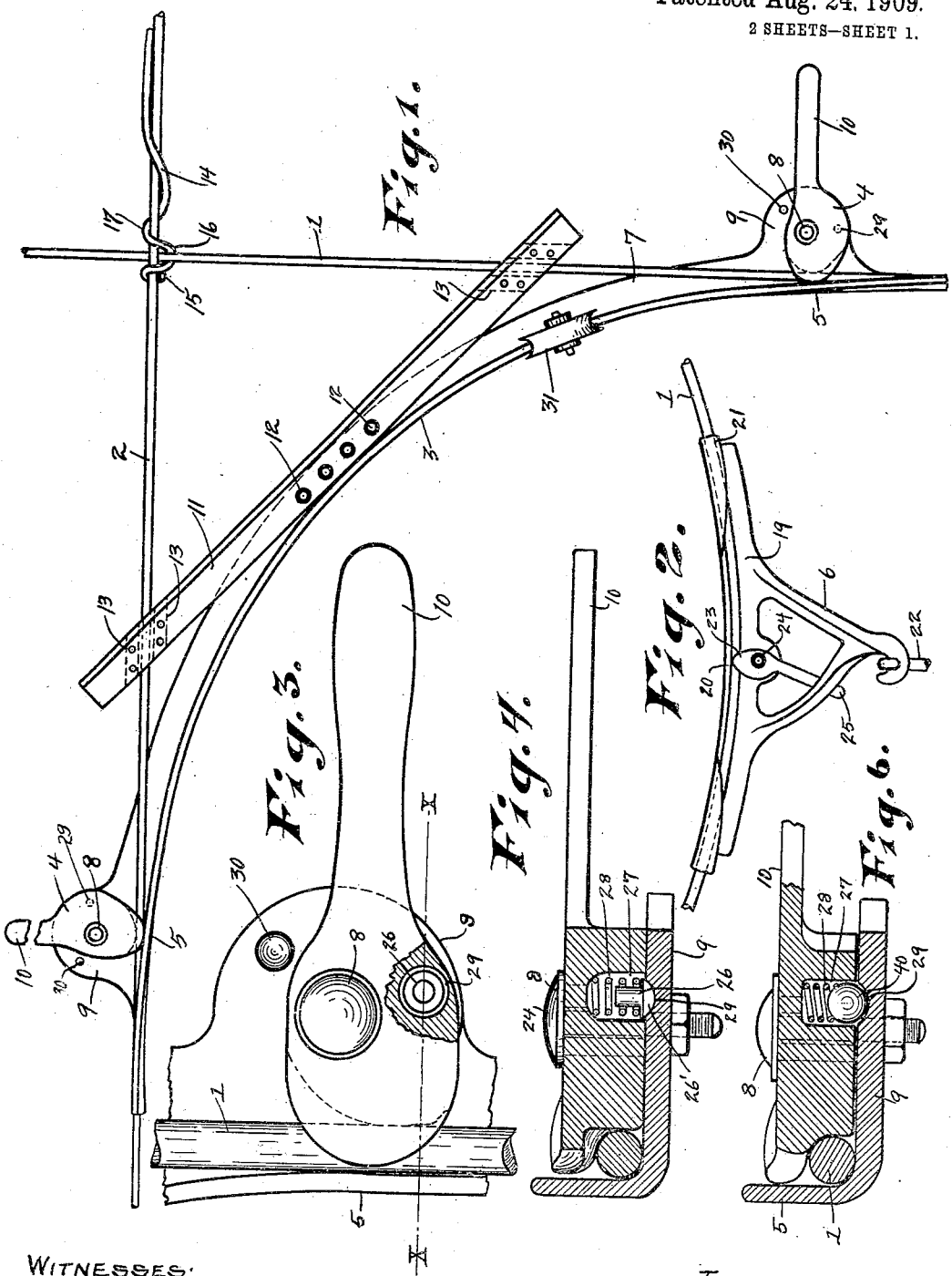
WITNESSES:
INVENTOR
William Gutenkunst
By Erwin & Wheeler
ATTORNEYS.

W. GUTENKUNST.
SWITCH MECHANISM FOR OVERHEAD CARRIER CABLES.
APPLICATION FILED MAR. 5, 1909.
931,861.
Patented Aug. 24, 1909.
2 SHEETS—SHEET 2.
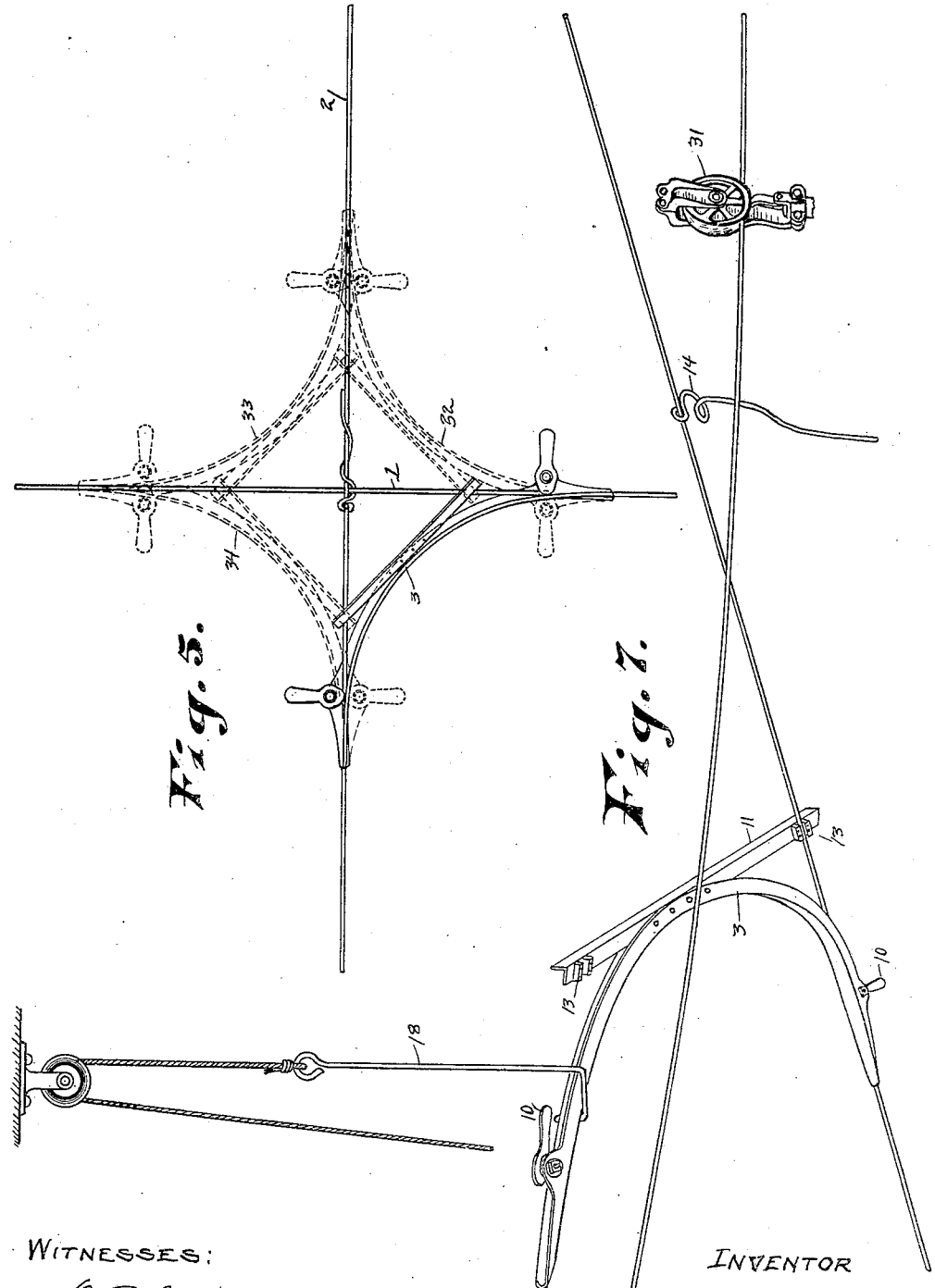
Witnesses:
O. R. Erwin
I. D. Bremer
Inventor
William Gutenkunst
By Erwin & Wheeler
Attorneys

UNITED STATES PATENT OFFICE.

WILLIAM GUTENKUNST, OF MILWAUKEE, WISCONSIN.

SWITCH MECHANISM FOR OVERHEAD CARRIER-CABLES.

931,861.  Specification of Letters Patent.  Patented Aug. 24, 1909.

Application filed March 5, 1909. Serial No. 481,339.

*To all whom it may concern:*

Be it known that I, WILLIAM GUTENKUNST, a citizen of the United States, residing at Milwaukee, county of Milwaukee, and State of Wisconsin, have invented new and useful Improvements in Switch Mechanism for Overhead Carrier-Cables, of which the following is a specification.

My invention relates to improvements in elevated track and switch mechanism for conveying litter carriers and the like, and it pertains more especially, among other things,—1st, to the device for automatically and quickly securing the respective ends of a curved switch to two supporting tracks or cables arranged at an angle to each other, whereby a truck may be readily run from one of said tracks to the other; 2nd, to the device for supporting the switch at one end only from one of said tracks, whereby the carrier may be run in a direct line past the switch upon the other track; 3rd, to the peculiar construction and arrangement of the coöperating parts, whereby the same switch may be used for conveying a truck or carriage from the main track toward either the right or left upon the side track, as shown at A and B in Figure 5 when moving forwardly, or at C and D when moving backwardly upon said main track, and whereby the carriage may be run from either side track to the main track in either direction, shown at A and C, and B and D in Fig. 5; 4th, to the device for temporarily tying the main and side tracks to each other at their junction, when a switch is being used for conveying the carriage from one of said tracks to the other; 5th, to the device for suspending either of said tracks at intermediate points between their respective ends; and 6th, to the device for yieldingly retaining the locking cam by which the ends of the switches are secured to the cable, in both its locked and unlocked position.

My invention is further explained by reference to the accompanying drawings, in which—

Fig. 1 represents a plan view of two cables connected together, showing the switch mechanism connected at its respective ends with said cables in position for conveying the carriage from one of said cables to the other. Fig. 2 is a plan view of the device for supporting the cables at intermediate points between its respective ends. Fig. 3 is a plan view, and Fig. 4 is a side view, part in section, of the locking mechanism by which the respective ends of the switch are clamped to the respective cables of the track. Fig. 5 is a plan view of the main track in connection with a side track arranged at right angles thereto, showing the switch leading from the main to one of the side tracks, indicating the other three positions of the switch referred to by dotted lines. Fig. 6 is a modified form of cam holding device, and Fig. 7 is a perspective view of the tracks in connection with the switch mechanism.

Like parts are identified by the same reference characters throughout the several views.

1 is the cable hereinafter referred to as the main cable of the system and 2, the branch or transversely arranged cable.

3 is a switch, which is connected at its respective ends with said main and branch cables, by and between the eccentric cams 4, 4, and the opposing track flange 5.

6 is a cable supporting bracket for supporting the cable at intermediate points between its respective ends. The switch mechanism comprises the vertical track flange 5 and the horizontally arranged flange 7. The flange 5 is curved outwardly at its respective ends, so as to partially surround and cover the respective cables 1 and 2, by which it is supported, and when said parts are placed upon the cables, as shown in Fig. 1, it is locked in place by the eccentric cams 4, 4, which eccentric cams 4 are pivotally supported in connection with the flange 7 by the pivotal bolts 8, said bolts 8 being rigidly affixed at their lower ends to the base 9, which is formed integrally with said flange 7, as shown in Fig. 1. When desirous to remove the switch from the supporting cables, the arms 10 of said eccentric cams are thrown toward the left, whereby their opposite ends are disengaged from the cable, when the switch is free to be removed. To more securely retain the switch in place, I preferably provide the same with a supporting bar 11, which is rigidly secured at its center to the flange 7 by a plurality of bolts 12, while the ends of said bar are adapted to rest upon the upper side of said cables as shown in Figs. 1 and 6. The lower side of said bar 11 is preferably provided at its respective ends with a pair of vertical flanges 13, which are adapted to engage upon the respective sides of said cable and aid in retaining said switch more rigidly in place.

When the switch is used for conveying the carriage from the main to the branch cables, as shown in Fig. 1, the respective cables 1 and 2 are temporarily secured together at their junction by the clamping wire 14, which wire 14 comprises the circular loop 15, which is adapted to engage around one of said cables, the loop 16, which is adapted to engage beneath the other cable, and the loop 17, which is adapted to engage the first named cable, when it passes from thence in a spiral course partially around said last named cable, whereby said cables are rigidly locked together. When desirous to convey the carriage in a direct line along the main cable 1, the end of the switch connected with such cable is disengaged therefrom by releasing the clamping cam at such end, when the released end of the switch is thrown up out of contact with said cable 1, when the detached end may be suspended from the hanger 18 as shown in Fig. 6. When the switch has been thus removed from the cable 1, the clamping wire 14 is disengaged from both of said cables when the carriage suspended from cable 1 is free to move forward and backward in a direct line past the junction of the cables, it being understood that the cable 1 will sag sufficiently to permit the carriage supporting rollers to pass beneath the transversely arranged cable 2.

The cable supporting bracket 6 comprises the horizontal flange 19, vertical flange 20, upon which the carriage is adapted to run as it passes said bracket, and cable inclosing lips 21, 21, which pass over the upper side and partially around the cable, whereby said bracket is retained in place. The bracket 6 is suspended from a support through a guy rod or cable 22 in the ordinary manner. The bracket 6 is temporarily locked to the cable by the eccentric cam 23 which is pivotally supported in connection with the horizontal flange 19, by and upon the bolt 24, whereby as the lever 25 is brought into the position shown, the cable is rigidly clamped between the end of the cam and the vertical flange 20, whereby said cable is prevented from sagging.

To retain the clamping cam 4 in either its locked or unlocked position, I have provided the same with a fastening stud or bearing 26, which is movably supported in the chamber 27 of said cam and is yieldingly retained in contact with the base of the cam supporting flange by the spiral spring 28, said spring 28 being interposed between the head 26' of said stud and the upper end of said chamber, whereby said stud is pressed downwardly against said base. The base 9 is provided on its upper surface with concave recesses 29 and 30 for the reception of the convex head of said stud, whereby when the operating lever 10 of said cam is brought into the position shown, the head 26' is forced by said spiral spring into the concave recess 29 and thereby retains said eccentric cam in its locked position. When, however, it is desired to release said cam from the supporting cable, the lever 10 will be moved toward the left, whereby the head 26' will be withdrawn from said recess and moved along the surface of said base until it is brought above the other concave recess 30, when it is forced by said spiral spring into said recess, whereby said eccentric cam will be retained in its unlocked position.

31 represents one of the rollers of a truck supported from the vertical flange of the switch in position for moving from one of the switch supporting cables to the other. If desired, a metallic ball 40 may be substituted for the stud 26, as shown in Fig. 6.

In Figs. 1 and 5, the switch is shown communicating between the main cable 1 and branch cable 2 upon the left, while the dotted line 32 in Fig. 5 indicates the position of the switch communicating between the main cable and branch cable upon the right. The dotted lines 33 and 34 indicate the position of the switch communicating between said branch cables and the main cable on the other or farther side of the junction of such cables with each other.

Having thus described my invention, what I claim as new, and desire to secure by Letters Patent, is—

1. In an over head track, the combination of two track cables suspended at an angle to each other, a switch member supported at its respective ends from said cables, an eccentric fastening cam pivotally supported at each end of said switch from an integral part thereof, a cable retaining flange and a cam operating lever, said cam being adapted as said lever is moved to clamp said cable in contact with the cable retaining flange of said switch.

2. In an over head track, the combination of two track cables suspended at an angle to each other, a switch member supported at its respective ends from said cables, a fastening clamp connected with the respective ends of said switch member and adapted to temporarily secure the switch to said cables, said clamp being provided with a yielding contact bearing adapted to impinge against its supporting surface, the supporting surface of said switch member being provided with recesses for the reception of said yielding contact bearing, whereby said clamping member is yieldingly retained in place at the end of its movement, both when in and out of contact with its supporting cable.

3. In an over head track, the combination of two track cables suspended at an angle to each other, a switch member supported at its respective ends from said cables, a fastening clamp connected with the respective ends of said switch member and adapted to temporarily secure the switch to said cables, one or more brackets connected with said cables at an intermediate point between their respective ends, said brackets being provided at their respective ends with retaining flanges extending above and partially around said cables and an eccentric clamping cam pivotally supported from an integral part of said bracket and adapted to impinge against and temporarily secure said cables within and beneath said retaining flanges and supporting guy cables communicating between said brackets and a support, all substantially as and for the purpose specified.

In testimony whereof I affix my signature in the presence of two witnesses.

WILLIAM GUTENKUNST.

Witnesses:
O. R. ERWIN,
JAS. B. ERWIN.